US008730761B2

(12) United States Patent
Ferber

(10) Patent No.: US 8,730,761 B2
(45) Date of Patent: May 20, 2014

(54) ATTENUATING NOISE IN SEISMIC DATA

(75) Inventor: Ralf Ferber, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 1433 days.

(21) Appl. No.: 11/957,743

(22) Filed: Dec. 17, 2007

(65) Prior Publication Data

US 2009/0154291 A1 Jun. 18, 2009

(51) Int. Cl.
*G01V 1/38* (2006.01)

(52) U.S. Cl.
USPC ............... 367/21; 367/15; 367/38; 702/17

(58) Field of Classification Search
USPC ......... 114/244, 254; 307/43; 340/7; 364/421;
367/15, 16, 20, 52, 56, 73, 137;
702/6–18; 703/5; 341/13, 14, 31, 137;
341/143, 144, 151, 61; 359/138, 193, 227,
359/238; 375/350; 708/300; 713/600
See application file for complete search history.

(56) References Cited

U.S. PATENT DOCUMENTS

| | | | |
|---|---|---|---|
| 4,884,248 A * | 11/1989 | Laster et al. | 367/73 |
| 5,173,879 A | 12/1992 | Cung et al. | |
| 5,850,622 A | 12/1998 | Vassiliou et al. | |
| 6,009,042 A * | 12/1999 | Workman et al. | 367/15 |
| 6,023,658 A | 2/2000 | Jeffryes | |
| 6,446,008 B1 | 9/2002 | Ozbek | |
| 6,529,150 B1 * | 3/2003 | Shoop et al. | 341/137 |
| 6,542,094 B1 * | 4/2003 | Venkitachalam et al. | 341/61 |
| 6,574,567 B2 | 6/2003 | Martinez | |
| 6,668,228 B1 | 12/2003 | Ozbek et al. | |
| 6,671,223 B2 | 12/2003 | Bittleston | |
| 6,684,160 B1 | 1/2004 | Ozbek et al. | |
| 6,714,873 B2 | 3/2004 | Bakulin et al. | |
| 6,735,528 B2 | 5/2004 | Wood | |
| 6,738,715 B2 | 5/2004 | Shatilo et al. | |
| 6,801,473 B2 | 10/2004 | Matteucci et al. | |
| 6,807,488 B2 | 10/2004 | Van Borselen | |
| 6,829,538 B2 | 12/2004 | De Kok | |
| 6,947,509 B1 * | 9/2005 | Wong | 375/350 |
| 7,003,402 B2 * | 2/2006 | Christie et al. | 702/14 |
| 2004/0215396 A1 | 10/2004 | Christie et al. | |

OTHER PUBLICATIONS

Zwartjes et al., "Optimizing Reconstruction for Sparse Spatial Sampling," SEG Expanded Abstracts 19, 2162-2165 (2000).*
Duijndam et al., Reconstruction of Band-Limited Signals, Geophysics, 1999, p. 524-538, vol. 64, No. 2.
Duijndam et al., Reconstruction Of 3-D Seismic Signals Irregularly Sampled Along Two Spatial Coordinates, Geophysics, 1999, p. 253-263, vol. 65, No. 1.

(Continued)

*Primary Examiner* — Isam Alsomiri
*Assistant Examiner* — Daniel L Murphy

(57) ABSTRACT

The technologies described herein include systems and methods for reducing noise in seismic data. More specifically, implementations may determine an amount of over-sampling for a frequency range of seismic data. Then, implementations may determine frequency bands based on the over-sampling. For each frequency band minimum-noise seismograms may be selected from consecutively occurring blocks of seismograms, and the remaining seismograms within each block may be discarded. The minimum-noise seismograms may then be used to reconstruct the discarded seismograms. The reconstructed seismograms may contain less noise than the original seismograms and, consequently, the seismic data may contain less noise.

23 Claims, 10 Drawing Sheets

(56) References Cited

OTHER PUBLICATIONS

Rosenfeld, An Optimal and Efficient New Gridding Algorithm Using Singular Value Decomposition, Elscint MRI Center, 1998, p. 14-23, vol. 40 No. 1.

Rosenfeld, New Approach to Gridding Using Regularization and Estimation Theory, Magnetic Resonance in Medicine 2002, p. 193-202, vol. 48.

Extended Search Report of European Application Serial No. 08171867.8 dated Dec. 6, 2011.

* cited by examiner

ATTENUATING NOISE IN SEISMIC DATA

BACKGROUND

1. Field of the Invention

Implementations of various technologies described herein generally relate to methods and systems for attenuating noise in seismic data.

2. Description of the Related Art

The following descriptions and examples are not admitted to be prior art by virtue of their inclusion within this section.

Implementations of various technologies described herein generally relate to methods and systems of processing seismic data. Seismic data may be acquired in a seismic survey. In a seismic survey, a source may be activated to generate energy, which may be reflected back by the earth's sub-surface layers. The resultant seismic wavefield may be sampled by an array of seismic receivers disposed at a distance from the seismic source. Each receiver may be configured to acquire seismic data, which is normally in the form of a record representing the value of some characteristic of the seismic wavefield against time. The data received by a receiver and then recorded are collectively called a seismogram. Information about the earth's sub-surface can be obtained from the acquired seismic data.

In addition to information about the earth's sub-surface, the acquired seismograms may contain noise. The noise may reduce the accuracy of the information about the earth's sub-surface obtained or derived from the seismic data. The noise may come from various sources. For example, noise may be acquired in marine seismic data acquisition due to waves propagating along streamers used during marine seismic data acquisition. Noise may also be acquired from other vessels acquiring seismic data or drilling activity in a relatively close proximity to the survey area. Noise may also be acquired during land seismic data acquisition from sources such as ground-roll or air-waves.

In some circumstances, a portion of the noise may be filtered from the signal and the resulting filtered signal may be used to obtain information about the earth's sub-surface. Using a filtered signal, rather than an unfiltered signal, may increase the accuracy of the information about the earth's sub-surface derived from the signals.

One technique of filtering noise from a signal (e.g., a seismogram or a trace) is to use a band-pass filter. A band-pass filter may be configured such that desirable frequencies of the signal pass through the filter without being attenuated while undesirable frequencies (e.g., noise) are attenuated when the signal passes through the filter.

Although noise filtering (e.g., band-pass filtering) may attenuate some of the noise from the signal, the level of attenuation, or the amount of noise filtered from the signal may not be sufficient. That is, the filtered signal may still contain some noise, and thus the filtered signal may not increase the accuracy of the information regarding the earth's sub-surface to an acceptable level. Therefore, there exists a need for methods or systems designed to reduce more noise or do a better job of attenuating noise from seismic data signals.

SUMMARY

Described herein are implementations of various technologies for attenuating noise in seismic data.

According to one implementation, a method for attenuating noise in seismic data is provided. The method generally includes: selecting a degree of over-sampling of seismograms in the seismic data; splitting the seismic data into frequency bands based on the degree of over-sampling; for a plurality of blocks of seismograms, selecting a seismogram having the least noise from each block of seismograms; and reconstructing one or more seismograms using the selected seismograms.

According to another implementation, a computer readable medium containing a program is provided. When executed, the program performs operations that include: (a) selecting a degree of over-sampling of seismograms in the seismic data; (b) splitting the seismic data into plurality of frequency bands based on the degree of over-sampling; and (c) for a plurality of blocks of seismograms: selecting a seismogram having the least noise from each block of seismograms in the plurality of blocks of seismograms; discarding unselected seismograms in each block of seismograms; and reconstructing the discarded seismograms using the selected seismograms.

According to yet another implementation a computer system is provided. The computer system includes: a processor; and memory comprising program instructions executable by the processor to: select a degree of over-sampling of seismograms in the seismic data; split the seismic data into frequency bands based on the degree of over-sampling; for a plurality of blocks of seismograms, select a seismogram having the least noise from each block of seismograms, wherein each block of seismograms in the plurality of blocks of seismograms comprises a number of spatially-consecutively occurring seismograms; and reconstruct one or more seismograms using the selected seismograms.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

Implementations described herein provide techniques and devices for attenuating noise in seismic data and more specifically, for attenuating or reducing noise in seismic data by exploiting signal redundancy of multi-channel seismic data for low-frequency noise attenuation. In one implementation, the degree of over-sampling of a portion or portions of the seismic data may be determined. The seismic data may then be split into frequency bands which contain noise. For each frequency band, seismograms which make up the seismic data may be grouped into blocks based on the degree of over-sampling, and a seismogram within each block of seismograms may be selected. The selected seismograms may contain a minimum amount of noise in comparison to other seismograms. The remaining seismograms (i.e., the unselected seismograms) in each block may be discarded. The remaining seismograms (unselected seismograms) may then be reconstructed using the selected minimum-noise seismograms. The resulting-reconstructed seismograms may contain less noise than the original-discarded seismograms and, consequently, the final seismic data may contain less noise than the original seismic data.

Figure 1A:
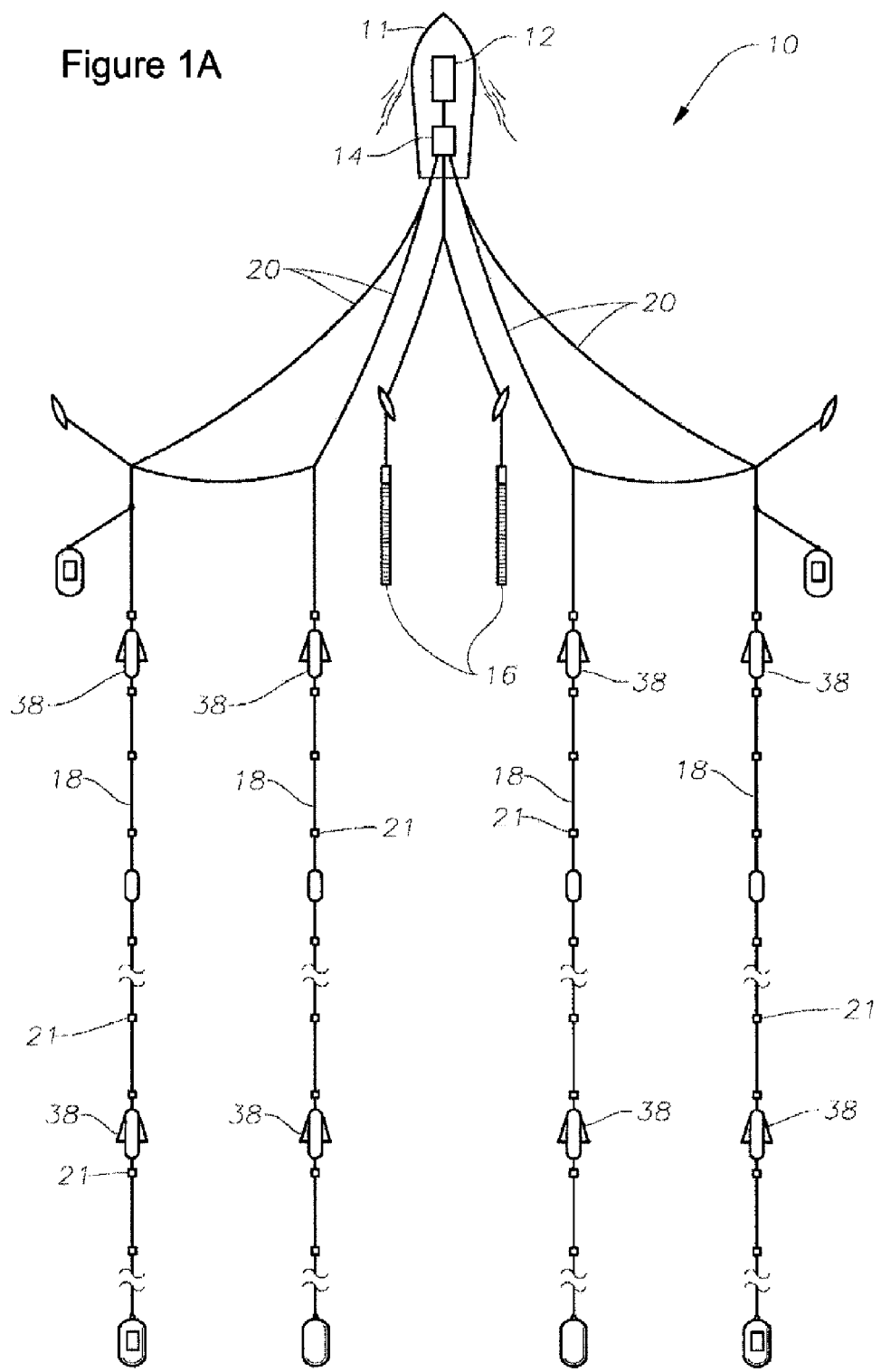
FIGS. 1A and 1B illustrate a typical marine seismic acquisition survey system for acquiring seismic data.
Figure 1B:
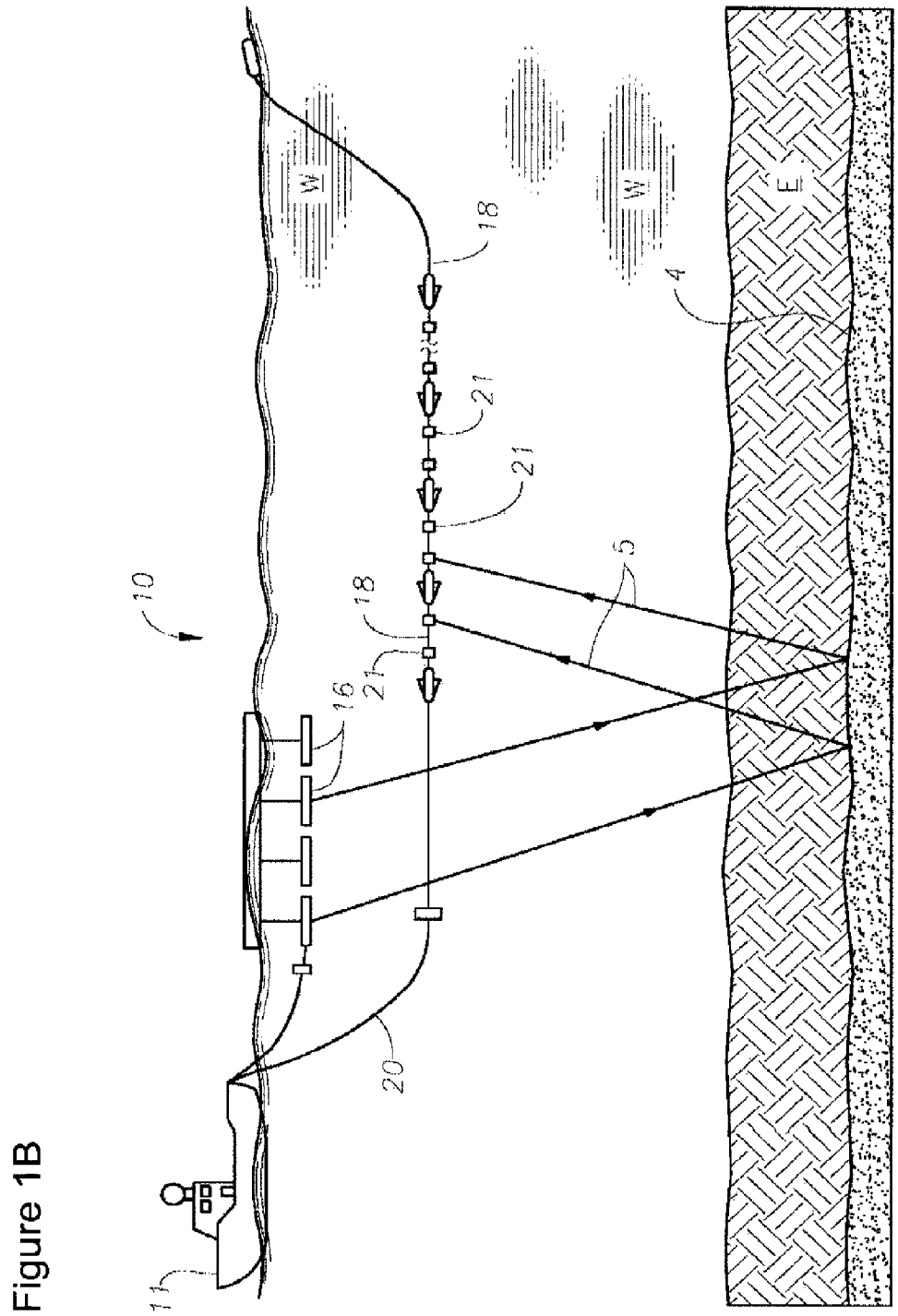

FIGS. 1A and 1B illustrate a typical marine seismic acquisition survey system 10 for acquiring seismic data, which may contain noise. Although implementations of various technologies described herein may be described with reference to the marine seismic acquisition survey system 10, it should be understood that other implementations may use a land seismic acquisition system or any other seismic acquisition system. Furthermore, it should also be understood that implementations may be applicable to any dimensionality of seismic data acquisition (e.g., 1D, 2D, 3D, etc.).

For purposes of clarity and simplicity, where marine seismic survey is discussed, positive X direction is the direction where the towing vessel is going. With reference to FIG. 1A, the Y direction is the horizontal direction perpendicular to the X direction. The Y direction may also be referred to as crossline direction. With reference to FIG. 1B, the positive Z direction is a vertical-up direction. For clarity, when referring to an airgun or similar single source, the word source will be used. When referring to a plurality of sources used collectively as a single source, the words source group will be used. When referring to a line of sources towed by a vessel, the words source array will be used.

The typical marine seismic acquisition system 10 may include a vessel 11 carrying control components 14 and towing a plurality of seismic sources 16 and a plurality of streamers 18 equipped with seismic receivers 21. The vessel 11 may further include a GPS receiver 12 coupled to the control components 14, which may be an integrated computer-based seismic navigation (TRINAV™), source controller (TRISOR™), and recording (TRIACQ™) system (collectively, TRILOGY™). The seismic sources 16 may be made of the same types of sources, or they may be made of different types of sources. The sources may be any type of common seismic generator, such as air guns, water guns, steam injection sources, explosive sources such as dynamite or gas injection followed by detonation and the like. The streamers 18 may be towed by means of their respective lead-ins 20, which may be made from high strength steel or fiber-reinforced cables that convey electrical power, control, and data signals between the vessel 11 and the streamers 18. Each streamer 18 may include a plurality of seismic receivers 21, distributed at spaced intervals along the streamer's length. Each receiver 21 may be a hydrophone sensor and the like. Each receiver 21 may be separately wired so that its output signal can be separately digitized and/or filtered, thereby permitting sophisticated processing known as digital group forming, as described in commonly assigned U.S. Pat. No. 6,684,160. Further, the streamers 18 may include a plurality of inline streamer steering devices (SSDs) 38, also known as "birds," such as Q-FIN™ birds of the kind described in commonly assigned U.S. Pat. No. 6,671,223. The SSDs may be distributed at appropriate intervals along the streamers 18 for controlling the streamers' depth and lateral movement.

During acquisition, the seismic sources 16 and the seismic streamers 18 may be deployed from the vessel 11 and towed very slowly, for example about 5 knots. The seismic sources 16 may be periodically activated, for example every 10 seconds or so, emitting seismic energy in the form of an acoustic wave through the water. Each source 16 may be activated independently or simultaneously with other sources. The acoustic wave may result in one or more wavefields that travel coherently into the earth E underlying the water W (see FIG. 1B). As the wavefields strike interfaces 4 between earth formations, or strata, they may be reflected back through the earth E and water W along paths 5 to the various receivers 21 where the wavefields (e.g., pressure waves in the case of air gun sources) may be converted to electrical signals, digitized and transmitted to the integrated computer-based seismic navigation, source controller, and recording system 14 (see FIG. 1A) in the vessel 11 via the streamers 18 and lead-ins 20. Through analysis of these detected signals (seismograms), it may be possible to determine the shape, position and lithology of the sub-sea formations, including those formations that may likely contain hydrocarbon deposits.

Method of Attenuating Noise in Seismic Data

As described above, each streamer 18 may include a plurality of seismic receivers 21, distributed at spaced intervals along the streamer's length. Close distribution of receivers 21 may result in an over-sampling of the seismic data. Over-sampling may result in a redundancy of seismic data for a range of frequencies. That is, due to the number of and spacing of receivers, more data may be acquired than is needed to determine information about the earth's sub-surface. Over-sampling may be more pronounced at lower frequencies. Implementations described herein may exploit the over-sampling of seismic data in order to reduce or attenuate noise in the seismic data.

Figure 2:
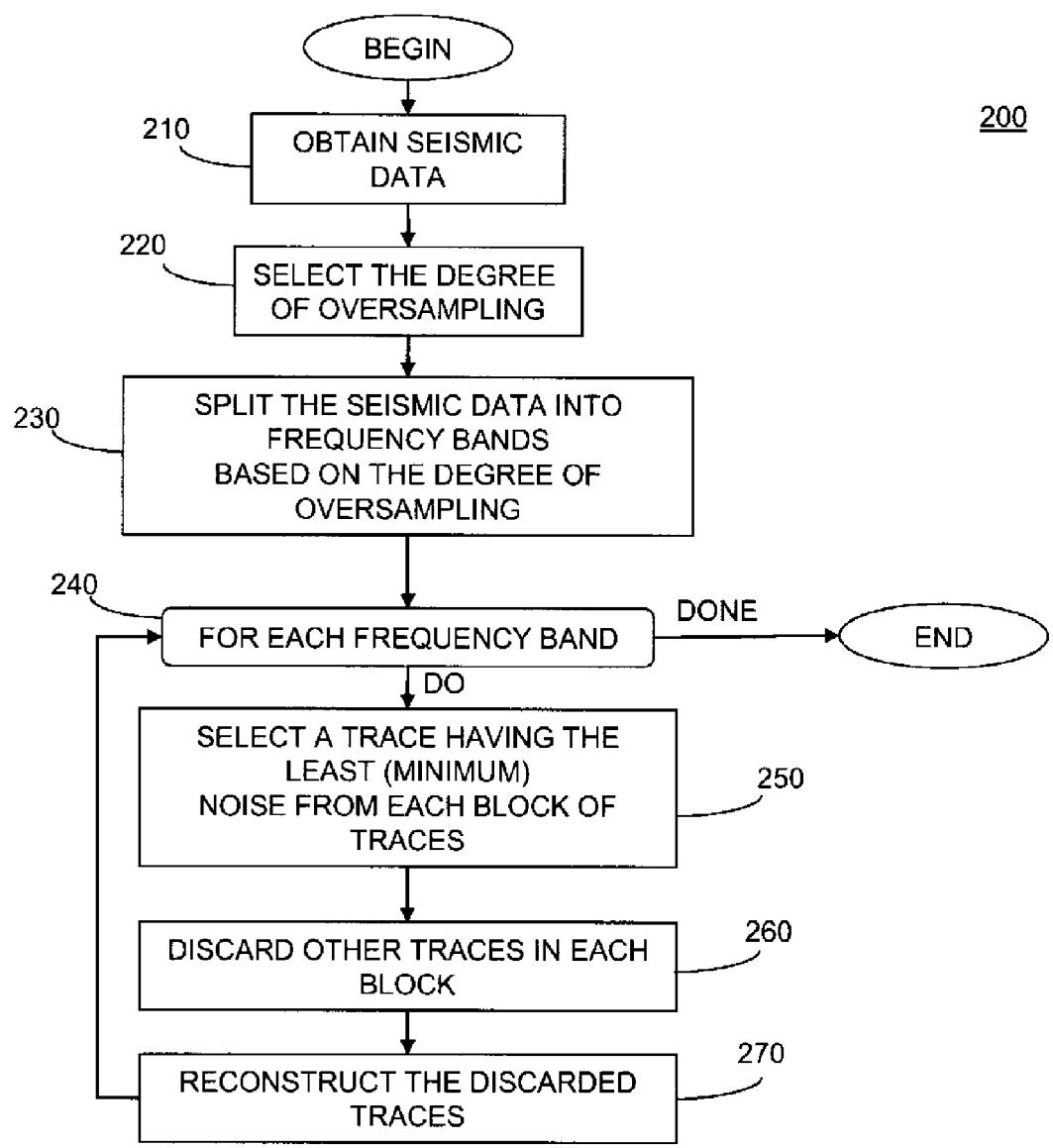
FIG. 2 is a flow diagram which illustrates a method of selecting seismograms containing a least amount of noise and reconstructing seismograms in accordance with implementations of various technologies described herein.

FIG. 2 is a flowchart which illustrates a method 200 for attenuating noise in seismic data in accordance with implementations of various techniques described herein. In general, the flowchart illustrates a method 200 of splitting the seismic data into frequency bands based on a selected degree of over-sampling, selecting seismogram data signals containing a least amount of noise, and reconstructing the seismogram data signals. The method 200 may begin at step 210 where seismic data may be obtained. The seismic data may be obtained in any suitable manner. For example, the seismic data may be obtained using the marine seismic acquisition survey system 10 described above with regards to FIGS. 1A and 1B. However, it should be understood that other implementations may use any other suitable seismic acquisition system (e.g., land based) to obtain seismic data, or a combination of seismic acquisition systems to obtain seismic data.

After acquiring the seismic data in step 210, at step 220 a degree of over-sampling may be selected for the seismic data. The degree of over-sampling may be an integer number which may be expressed as or represented by the letter n. If a frequency range within the seismic data is over-sampled by a factor of n, then there will be n seismograms, or samples, in the over-sampled frequency range. Some of the seismograms within an over-sampled frequency range may be redundant. A redundant seismogram may be one which may be discarded and later reconstructed using another seismogram or seismograms. As described further below, this redundancy may be exploited in order to reduce or attenuate the noise in the seismic data.

Next, at step 230, the seismic data or seismograms may be split into frequency bands in which the signal is over-sampled by a degree of n. The selection of a frequency band or bands in which the data is over-sampled by a degree of n (n-times over-sampling) depends on the minimum apparent velocity of a signal and the spatial sampling interval (e.g., distance between receivers). Using the relationship f=kv between the frequency (f), the wave-number (k), and apparent velocity (v), a frequency can be calculated which has a degree of over-sampling equal to n. The wave-number (k) for a degree of over-sampling equal to n along one spatial axis may be calculated based on the formula $$k_n = \frac{1}{n2\Delta x},$$

where $\Delta x$ is the sensor spacing and n is the degree of over-sampling. Thus, using the degree of over-sampling n, the limits (i.e., upper limits) of over-sampled frequency bands may be calculated.

Figure 3:
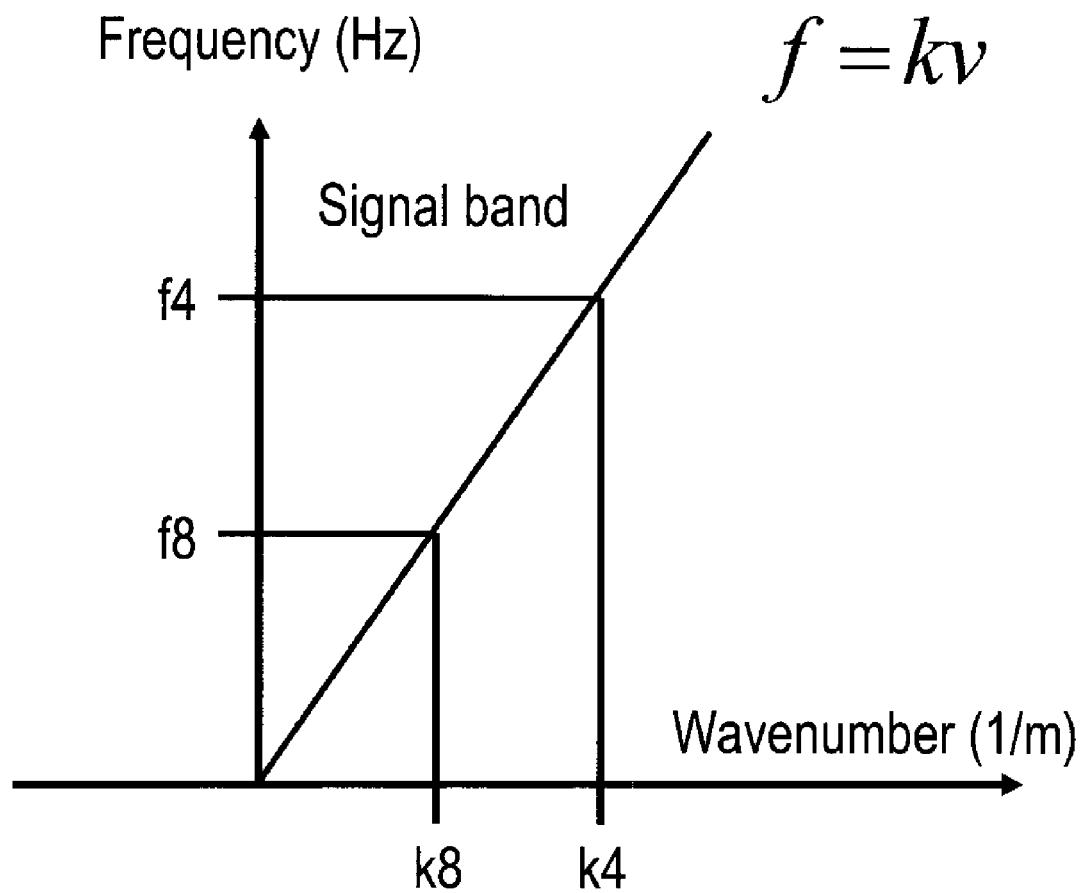
FIG. 3 is a graph which illustrates a relationship between frequency and wave-number, in accordance with implementations of various technologies described herein.

FIG. 3 illustrates the relationship between frequency and wave-number. As illustrated in FIG. 3, as the wave-number increases (e.g., via a decrease in over-sampling), the upper limit of a frequency band increases. Consequently, the smaller the degree of over-sampling (the larger the wave number), the higher the upper-limit frequency. In contrast, the larger the degree of over-sampling (the smaller the wave number), the lower the upper-limit frequency.

An example of calculating a degree of over-sampling for a selected frequency band now follows. A lowest signal velocity for seismic data signals in a medium may be 1500 meters/second. Furthermore, a frequency band under investigation may be chosen to be less than 30 Hz. Based on a signal velocity of 1500 m/s and a frequency band of less than 30 Hz, a sampling interval of 25 meters may be sufficient for seismic data processing purposes. That is, a single seismic receiver or sensor located every 25 meters may be sufficient for seismic data processing purposes.

However, a seismic streamer may have been used to collect the seismic data. This seismic streamer may have had a receiver or sensor located every 3.125 meters along the streamer. Therefore, the seismic data may be sampled (a seismogram may be recorded) at locations occurring every 3.125 meters along the streamer.

Consequently, for a signal velocity of 1500 m/s, a frequency band less than 30 Hz and a receiver or sensor spacing every 3.125 meters, the seismic data may be eight times over-sampled. The eight times over-sampling may be calculated using the formulas $$k_n = \frac{1}{n2\Delta x}$$

and f=kv presented above where f=30 Hz, v=1500 m/s, and $\Delta x$=3.125 m.

Returning to method 200, after the seismic data has been grouped into frequency bands based on the degree of over-sampling, a processing loop may begin at step 240. The processing loop may contain steps 250, 260 and 270 and the processing loop may repeat once for each frequency band. Each repetition of the processing loop may concern one particular frequency band.

In the first step of the processing loop, step 250, a minimum noise seismogram may be selected from each of a series of consecutively-occurring blocks of seismograms. A block of seismograms may be a number of seismograms which are spatially-consecutively occurring. Spatially-consecutively occurring seismograms may be seismograms that were generated from receivers consecutively located along a line of receivers (e.g., a streamer). In one implementation, the number of seismograms in a block of seismograms may be equal to the degree of over-sampling (n).

For example, as described above a frequency band may be over-sampled by a factor of eight. Consequently, consecutive blocks of eight seismograms each may be formed. For example, a streamer may contain 256 evenly spaced receivers, each may receive a signal and generate a seismogram. For a degree of over-sampling of eight, thirty-two consecutive blocks of eight seismograms may occur along the streamer, i.e., 256/8=32.

Figure 4:
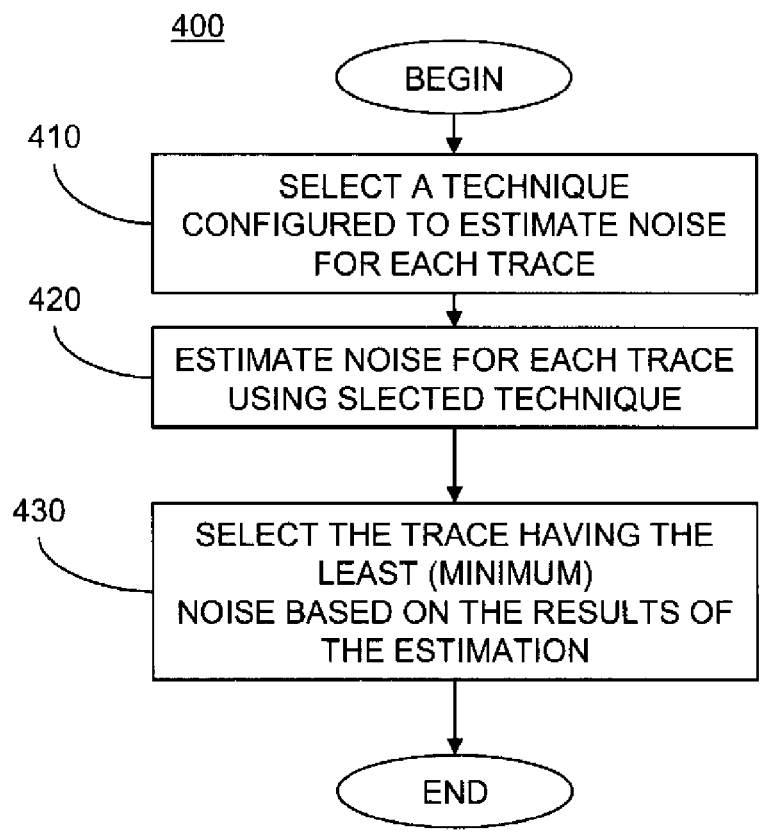
FIG. 4 is flow diagram which illustrates a method of selecting a seismogram which contains a minimum amount of noise in accordance with implementations of various technologies described herein.

During step 250 a minimum noise seismogram may be selected from each block of seismograms using any sufficient technique. FIG. 4 illustrates one exemplary method 400 of selecting a minimum noise seismogram from a block of seismograms according to one implementation. The method 400 begins at step 410 where a technique configured to estimate the noise for each seismogram in a block of seismograms is selected. In one implementation, the technique may include calculating a root means square energy for each seismogram. However, other implementations may use other suitable techniques. Next, at step 420 the noise for each seismogram may be estimated using the technique selected in step 410. Then, at step 430 a seismogram with the minimum amount of noise within each block of seismograms may be selected based on the estimated noise values determined in step 420. The minimum-noise seismogram for a block of seismograms may be selected by comparing the noise level of each seismogram within a block of seismograms and selecting the seismogram which contains the lowest noise in comparison to the other seismograms within the block of seismograms.

Returning to step 410, one noise estimation technique may be to estimate the root means square energy of the noise portion of each seismogram. This may be accomplished by calculating the root means square energy of the seismogram before a first break. The first break is the onset of a seismogram (i.e., where the particle motion breaks away from zero due to the arrival of a seismic wave). Consequently, any non-zero energy within the seismogram before the first brake may be due to noise. Furthermore estimating the noise portion of a seismogram may be accomplished by calculating the root means square energy of the seismogram in a part of the seismogram that is at least fully dominated by noise (e.g., at the highest recording times). Next at step 420, the root means square energy of the noise may be calculated for each seismogram in a block of seismograms. Then, at step 430 a seismogram with noise having the minimum amount of root means square energy may be selected by comparing the noise root means square energy of all seismograms within a block, and selecting the seismogram with the minimum amount of noise root means square energy within that block.

After determining or selecting the minimum noise seismograms for each block of seismograms in step 250 (e.g., using method 400), at step 260 the other seismograms which do not contain the minimum amount of noise may be discarded. These non-minimum noise seismograms may be discarded because, as described above, they may be redundant due to over-sampling of the seismic data within the frequency range.

Next, at step 270 the seismograms which were discarded in step 260 may be reconstructed. That is, the seismograms which did not contain the minimum amount of noise may be reconstructed. The discarded seismograms may be reconstructed, for example, using the information contained in the seismograms which contained the minimum amount of noise (i.e., the seismograms which were not discarded). According to one implementation, the seismograms may be reconstructed using Fourier regularization. Reconstruction using Fourier regularization has been described by Duijndam, Shonewille, and Hindriks in "Reconstruction of band-limited signals, irregularly sampled along one spatial direction," *Geophysics, vol.* 64, pp. 524-538, March-April 1999. According to another implementation, the seismograms may be reconstructed using compact Fourier interpolation.

Both Fourier interpolation and Fourier regularization are interpolation techniques for irregular spaced or irregularly sampled seismic data. That is, Fourier interpolation and Fourier regularization are techniques to estimate data at locations at which data has not been recorded from actual data at actual recording locations. Consequently, Fourier interpolation and Fourier regularization may be used to estimate/reconstruct the seismograms which were discarded.

Fourier regularization transforms the data from actual spatial sampling locations (e.g., seismograms which were not discarded) to the corresponding wave-number domain in a first step. The next step is to compensate for distortions due to the actual irregular spatial sampling in the wave-number domain. Finally, an inverse Fourier transform takes the compensated wave-number domain data back to regular spatial sampling locations (e.g., seismograms which were discarded). Compact Fourier interpolation transforms data from the actual irregular spatial sampling locations (e.g., seismograms which were not discarded) to regular spatial sampling locations (e.g., seismograms which were discarded) in a single step. Data at the regular locations (e.g., seismograms which were discarded) may be computed as a weighted sum over actual seismograms in the direct spatial vicinity (e.g., seismograms which were not discarded).

After reconstructing the discarded seismograms in the frequency band under processing, processing may begin on the next frequency band by returning to the beginning of the processing loop (i.e., step 240) and executing the steps within the processing loop (i.e., steps 250, 260, and 270). After all frequency bands have been processed, the method 200 may end.

The reconstructed seismic data may contain less noise than the seismic data originally acquired by the seismic receivers (e.g., seismic receivers 21). Consequently, the reconstructed seismic data may improve the information about the earth's sub-surface obtained or derived from the seismic data.

Although the grouping of seismograms into blocks was described above using a constant over-sampling value (e.g., n), implementations may vary the over-sampling value for different frequency bands. Consequently, some frequency bands may contain smaller or larger blocks of seismograms as the over-sampling value is varied.

Furthermore, according to other implementations, attenuating noise by selecting minimum noise seismograms and reconstructing seismograms as described above may be used alone in order to attenuate noise or may be used in conjunction with other noise attenuation techniques in order to attenuate noise. For example, attenuating noise by selecting minimum noise seismograms and reconstructing seismograms may be used in conjunction with band-pass filtering in order to attenuate noise.

Example of Noise Attenuation

Figure 5:
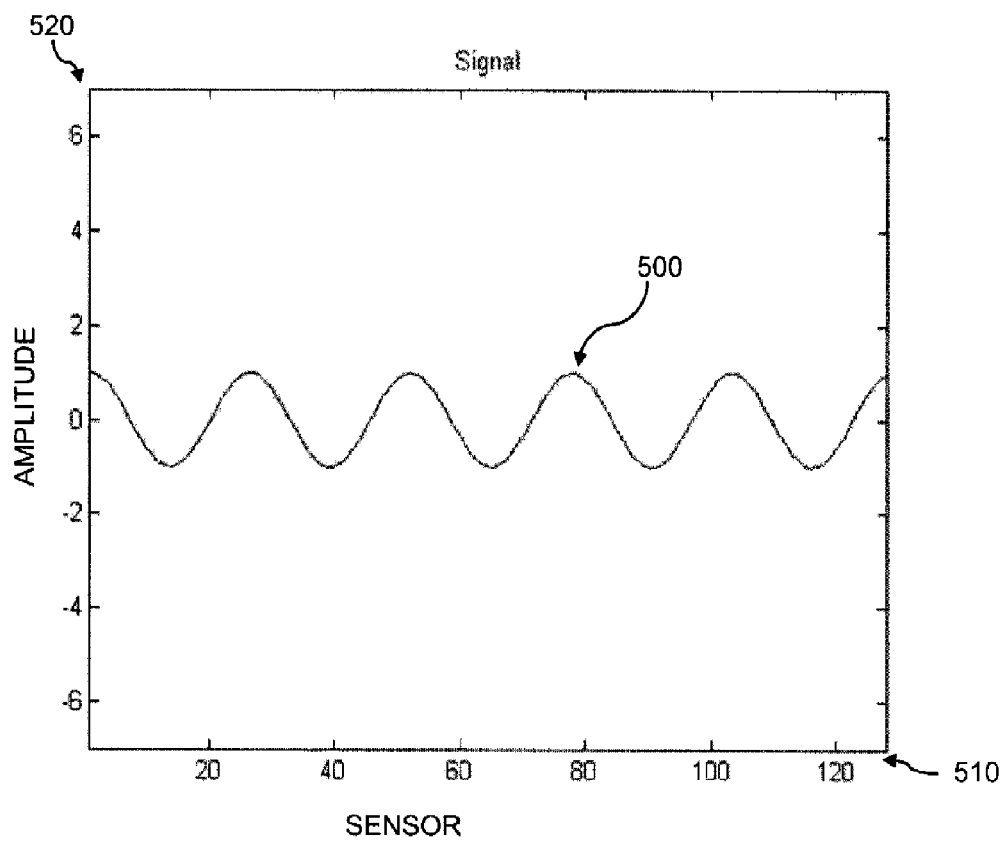
FIGS. 5 and 6 are graphs which contain plots of exemplary seismic data.

An example of attenuating noise from seismic data using implementations described above will now be described in paragraphs [0049]-[0058]. FIG. 5 is a graph containing a plot of an exemplary noise-free seismic-data signal 500. The exemplary seismic-data signal 500 is plotted along a horizontal 510 and a vertical axis 520. Locations along the horizontal axis 510 correspond to sensors collecting seismogram data (e.g., sensors 21 along a seismic streamer 18) and locations along the vertical axis 520 correspond to amplitudes measured by sensors. As illustrated, the exemplary seismic data signal is shaped like a sine curve with approximately five cycles in amplitude along the horizontal axis 510.

Figure 6:
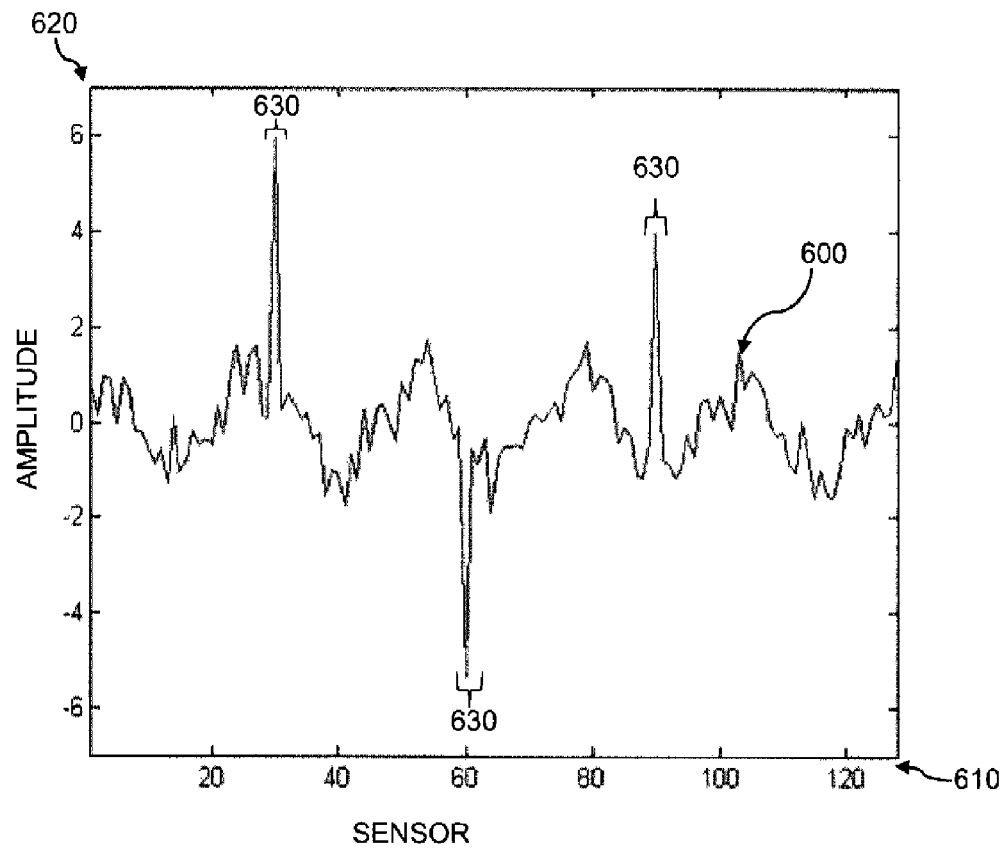

In contrast, FIG. 6 is a graph containing a plot of an exemplary noisy-seismic-data signal 600. Similar to FIG. 5, values along the horizontal axis 610 corresponds to sensors collecting seismogram data and values along the vertical axis 620 correspond to amplitudes measured by sensors. Furthermore, similar to the noise-free seismic data signal 500, the noisy-seismic data signal 600 cycles approximately five times along the horizontal axis 610. However, in contrast to the noise-free seismic data signal 500 illustrated in FIG. 5, the noisy seismic data signal 600 contains noise. The noise is illustrated in FIG. 6 by the jagged edges and random peaks 630 along the seismic data signal 600.

As described above, this noise may be caused by several factors (e.g., waves propagating along a streamer, ground-roll, other seismic acquisition activity in the vicinity of the streamer, drilling activity, etc.). Because the signal 600 contains noise, the implementation techniques described above with regards to FIG. 2 and FIG. 3 may be applied to the seismic data signal 600 in order to reduce or attenuate the noise in the noisy seismic data signal 600.

First, as described above in method 200, a degree of over-sampling may be selected. For example, eight (n=8) may be selected as the degree of over-sampling. Next, at step 230 the seismic data may be split into frequency bands based on the degree of over-sampling.

Further, as illustrated by the horizontal axis in FIG. 5, one hundred and twenty-eight receivers may be used to acquire seismic data. The 128 receivers may record 128 seismograms of seismic information. Furthermore, based on a degree of over-sampling of eight, the 128 seismograms may be grouped into thirty-two consecutively occurring blocks (128/8=32). Each of the thirty-two blocks may contain eight seismograms.

Next at step 250 of method 200, the seismograms within the blocks may be analyzed to determine a seismogram within each block which contains the least or the minimum amount of noise compared to other seismograms within its own block. A seismogram which contains the minimum amount of noise may be selected for each block in step 250 and then, in step 260, the other/unselected seismograms within the blocks may be discarded.

Figure 7:
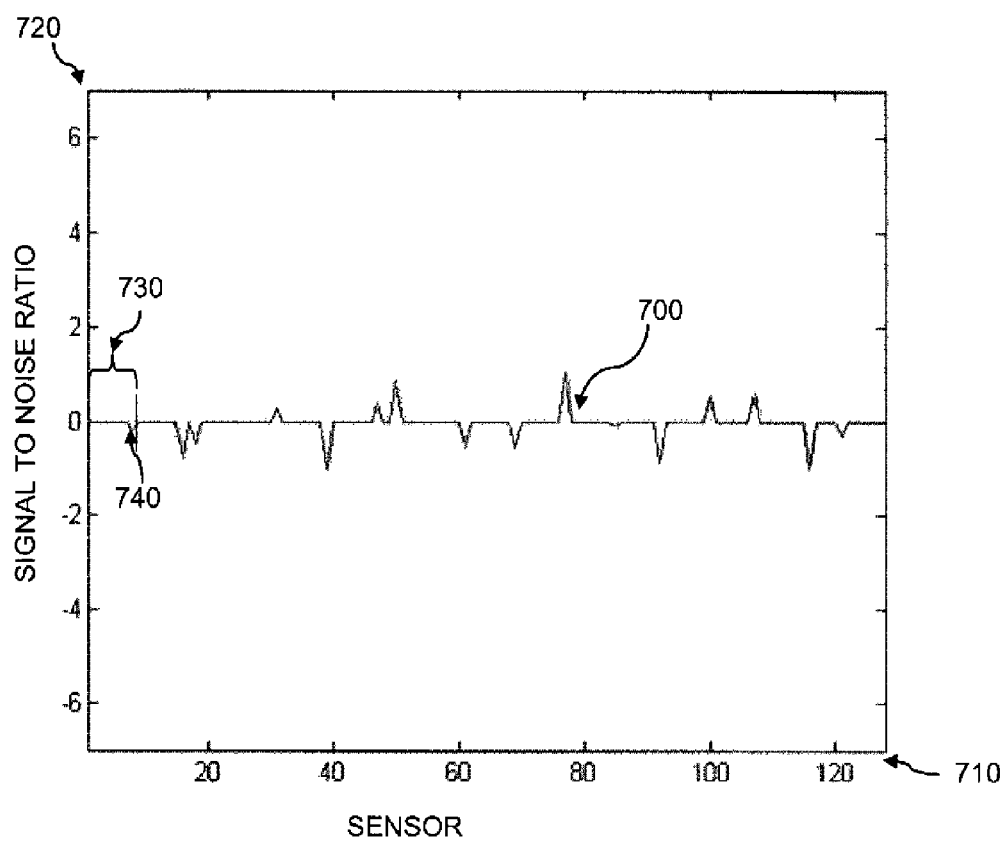
FIG. 7 is a graph which contains a plot of the signal-to-noise ratio of selected seismograms in accordance with implementations of various technologies described herein.

For example, FIG. 7 is a graph which contains a plotted line 700 illustrating discarded seismograms and the signal-to-noise ratio of selected seismograms. The graph contains a horizontal axis 710 corresponding to sensors and a vertical axis 720 corresponding to signal-to-noise ratio of seismograms. The plotted line contains portions which have a zero signal-to-noise ratio value. The zero portions of the graph correspond to seismograms which were discarded in step 260 of method 200. In other words, those seismograms which did not contain the minimum amount of noise in their corresponding block are illustrated in the plotted line 700 with a zero signal-to-noise value.

The plotted line 700 in FIG. 7 also contains portions which have non-zero signal-to-noise values. The non-zero portions of the plotted line 700 correspond to seismograms which contained the minimum amount of noise in their corresponding block of seismograms. For example, if the selected oversampling value was eight, each block of seismograms may have eight seismograms. Consequently, each block of eight seismograms contains one selected seismogram. As illustrated in FIG. 7, the first block of seismograms 730 contains one non-zero value 740 which corresponds to the seismogram with the minimum amount of noise in the first block of seismograms 730. Furthermore, other non-zero values are illustrated FIG. 7 in other blocks of seismograms, the other non-zero values corresponding to seismograms containing the minimum amount of noise in their respective blocks of seismograms.

After the minimum noise seismograms have been selected, in step 260 of method 200 the seismograms which do not contain the minimum noise may be discarded. Next, in step 270 the discarded seismograms may be reconstructed using the selected seismograms (i.e., seismograms containing the minimum amount of noise in their respective blocks of seismograms).

Figure 8:
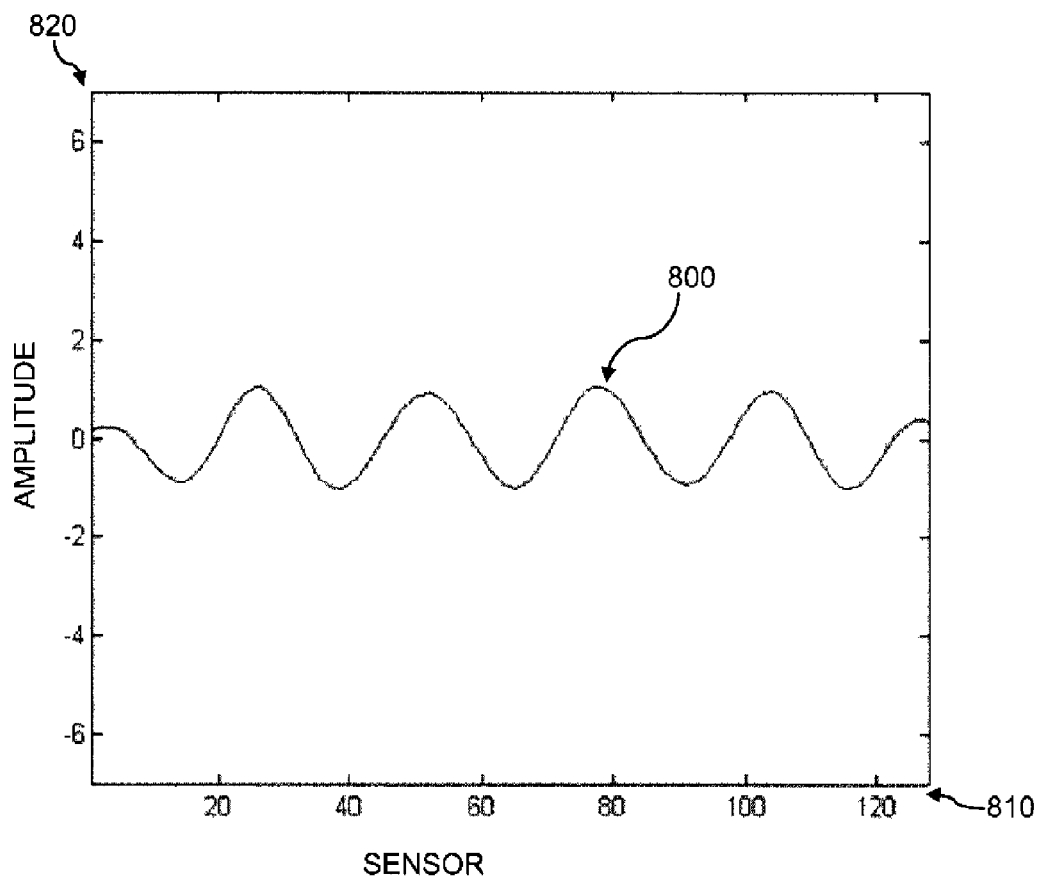
FIG. 8 is a graph which contains a plot of exemplary seismic data which was reconstructed in accordance with implementations of various technologies described herein.

FIG. 8 illustrates an exemplary reconstructed seismic data signal 800. Similar to FIGS. 5 and 6, values along the horizontal axis 810 correspond to sensors and values along the vertical axis 820 correspond to the amplitude of the reconstructed seismic data signal 800. As illustrated, the reconstructed seismic data signal 800 contains less noise (i.e., less jagged edges and random spikes 630) than the noisy seismic data signal 600 illustrated in FIG. 6. Consequently, the implementations described herein may reduce the noise present in seismograms by selecting minimum noise seismograms in blocks of seismograms and reconstructing the seismic data using the selected minimum noise seismograms.

Figure 9:
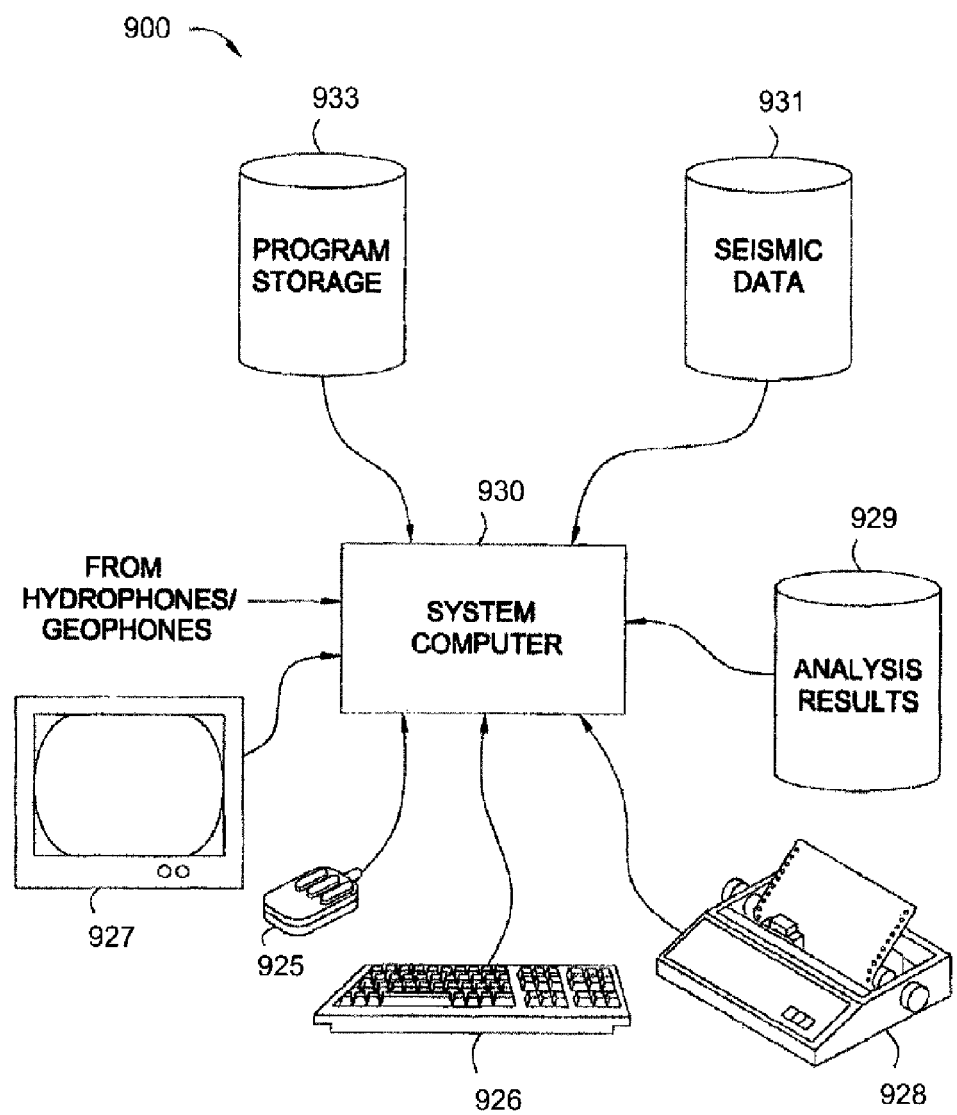
FIG. 9 illustrates an exemplary computer network in accordance with implementations of various technologies described herein.

FIG. 9 illustrates a computer network 900, into which implementations of various technologies described herein may be implemented. The computer network 900 may include a system computer 930, which may be implemented as any conventional personal computer or server. However, those skilled in the art will appreciate that implementations of various technologies described herein may be practiced in other computer system configurations, including hypertext transfer protocol (HTTP) servers, hand-held devices, multi-processor systems, microprocessor-based or programmable consumer electronics, network PCs, minicomputers, mainframe computers, and the like.

The system computer 930 may be in communication with disk storage devices 929, 931, and 933, which may be external hard disk storage devices. It is contemplated that disk storage devices 929, 931, and 933 are conventional hard disk drives, and as such, will be implemented by way of a local area network or by remote access. Of course, while disk storage devices 929, 931, and 933 are illustrated as separate devices, a single disk storage device may be used to store any and all of the program instructions, measurement data, and results as desired.

In one implementation, seismic data from the receivers may be stored in disk storage device 931. The system computer 930 may retrieve the appropriate data from the disk storage device 931 to process seismic data according to program instructions that correspond to implementations of various technologies described herein. The program instructions may be written in a computer programming language, such as C++, Java and the like. The program instructions may be stored in a computer-readable medium, such as program disk storage device 933. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 930 may present output primarily onto graphics display 927, or alternatively via printer 928. The system computer 930 may store the results of the methods described above on disk storage 929, for later use and further analysis. The keyboard 926 and the pointing device (e.g., a mouse, trackball, or the like) 925 may be provided with the system computer 930 to enable interactive operation.

The system computer 930 may be located at a data center remote from the survey region. The system computer 930 may be in communication with the receivers (either directly or via a recording unit, not shown), to receive signals indicative of the reflected seismic energy. These signals, after conventional formatting and other initial processing may be stored by the system computer 930 as digital data in the disk storage 931 for subsequent retrieval and processing in the manner described above. While FIG. 9 illustrates the disk storage 931 as directly connected to the system computer 930, it is also contemplated that the disk storage device 931 may be accessible through a local area network or by remote access. Furthermore, while disk storage devices 929, 931 are illustrated as separate devices for storing input seismic data and analysis results, the disk storage devices 929, 931 may be implemented within a single disk drive (either together with or separately from program disk storage device 933), or in any other conventional manner as will be fully understood by one of skill in the art having reference to this specification.

Although the various technologies described herein where discussed in reference to marine seismic surveys, the various technologies described herein may also be applicable to land seismic survey, sea-bed seismic survey or any other seismic survey.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for attenuating noise in seismic data, comprising:
  selecting a degree of over-sampling of seismograms in the seismic data that had been acquired using seismic receivers;
  splitting the seismic data into one or more frequency bands based on the degree of over-sampling;
  for at least one of the frequency bands, selecting a seismogram having the least noise from a block of seismograms defined by the at least one of the frequency bands; and
  constructing one or more seismograms using the selected seismogram.

2. The method of claim 1, wherein the block of seismograms comprises a number of spatially-consecutively occurring seismograms.

3. The method of claim 2, wherein the number of spatially-consecutively occurring seismograms is equal to the degree of over-sampling.

4. The method of claim 1, wherein selecting the seismogram having the least noise comprises:
  selecting a technique configured to estimate noise in seismograms;
  estimating noise for each seismogram in the block of seismograms using the selected technique; and
  selecting the seismogram in the block of seismograms having the least noise based on the estimated noise.

5. The method of claim 4, wherein the technique comprises calculating a root mean square energy of noise for each seismogram.

6. The method of claim 1, wherein constructing the seismograms using the selected seismogram comprises: constructing the seismograms using Fourier regularization.

7. The method of claim 1, wherein the degree of over-sampling is selected according to k=1/n2Δx and f=kv where f refers to a frequency band, v refers to the lowest signal velocity for the seismic data, n refers to the degree of over-sampling, and Δx refers to the distance between the receivers.

8. The method of claim 1, wherein the seismic data in the frequency bands are over-sampled.

9. The method of claim 1, wherein the seismic data in the frequency bands comprise noise.

10. The method of claim 1, wherein the least noise comprises noise that had been acquired during seismic data acquisition.

11. A method for attenuating noise in seismic data, comprising:
  selecting a degree of over-sampling of seismograms in the seismic data that had been acquired using seismic receivers;
  splitting the seismic data into frequency bands based on the degree of over-sampling;
  for at least one block in a plurality of blocks of seismograms, selecting a seismogram having the least noise from the at least one block of seismograms; and
  constructing one or more seismograms based on the selected seismogram and compact Fourier interpolation.

12. A non-transitory computer readable medium containing a program which, when executed, performs operations comprising:
  selecting a degree of over-sampling of seismograms in the seismic data that had been acquired using seismic receivers;
  splitting the seismic data into one or more frequency bands based on the degree of over-sampling; and
  for at least one of the frequency bands, selecting a seismogram having the least noise from a block of seismograms defined by the at least one of the frequency bands;
  discarding unselected seismograms in the block of seismograms; and
  reconstructing the discarded seismograms using the selected seismogram.

13. The computer readable medium of claim 12, wherein the block of seismograms comprises a number of spatially-consecutively occurring seismograms.

14. The computer readable medium of claim 13, wherein the number of spatially-consecutively occurring seismograms is equal to the degree of over-sampling.

15. The computer readable medium of claim 12, wherein selecting the seismogram having the least noise comprises:
  selecting a technique configured to estimate noise in seismograms;
  estimating noise for each seismogram in the block of seismograms using the selected technique; and
  selecting the seismogram in the block of seismograms having the least noise based on the estimated noise.

16. The computer readable medium of claim 15, wherein the technique comprises calculating a root mean square energy of noise for each seismogram in the block of seismograms.

17. The computer readable medium of claim 12, wherein reconstructing the discarded seismograms using the selected seismograms comprises reconstructing seismograms using Fourier regularization, compact Fourier interpolation, or combinations thereof.

18. A computer system, comprising:
  a processor; and
  memory comprising program instructions executable by the processor to:
    select a degree of over-sampling of seismograms in the seismic data that had been acquired using seismic receivers;
    split the seismic data into one or more frequency bands based on the degree of over-sampling;
    for at least one of the frequency bands, select a seismogram having the least noise from a block of seismograms defined by the at least one of the frequency bands, wherein the block of seismograms comprises a number of spatially-consecutively occurring seismograms; and
    construct one or more seismograms using the selected seismogram.

19. The computer system of claim 18, wherein the number of spatially-consecutively occurring seismograms in the block of seismograms is equal to the degree of over-sampling.

20. The computer system of claim 18, wherein the instructions which are executable by the processor to select the seismogram having the least noise comprise instructions executable by the processor to:
  select a technique configured to estimate noise in seismograms; and
  estimate noise for each seismogram in the block of seismograms using the selected technique; and
  select the seismogram in the block of seismograms having the least noise based on the estimated noise.

21. The computer system of claim 20, wherein the technique comprises calculating a root mean square energy of noise for each seismogram.

22. The computer system of claim 18, wherein the instructions which are executable by the processor to reconstruct one or more seismograms using the selected seismograms comprise instructions executable by the processor to:
  reconstruct seismograms using Fourier regularization, or compact Fourier interpolation or combinations thereof.

23. A method, comprising:
  for a seismic dataset that corresponds to a subterranean region, wherein the seismic dataset had been acquired using seismic receivers, and the seismic dataset includes a plurality of blocks of seismograms:
  selecting in the seismic dataset a degree of over-sampling of one or more seismograms in the plurality of blocks of seismograms;
  splitting at least part of the seismic dataset into a plurality of respective frequency bands, wherein:
    the respective frequency bands in the plurality of frequency bands correspond to respective parts of the seismic dataset, and
    splitting the at least part of the seismic dataset into the plurality of respective frequency bands is based at least in part on the degree of over-sampling;
  selecting a frequency band from the plurality of respective frequency bands;
  selecting a seismogram from a part of the at least part of the seismic dataset that corresponds to the selected frequency band, wherein the selected seismogram has the least noise of seismograms in the part of the at least part of the seismic dataset that corresponds to the selected frequency band; and
  using the selected seismogram to construct one or more seismograms in the part of the at least part of the seismic dataset that corresponds to the selected frequency band.

* * * * *